United States Patent [19]
Soltanoff

[11] 3,752,312
[45] Aug. 14, 1973

[54] LABEL, METHOD AND SYSTEM FOR BAGGAGE HANDLING

[76] Inventor: Louis Soltanoff, 127 Four Brooks Rd., Stamford, Conn. 06903

[22] Filed: Feb. 16, 1971

[21] Appl. No.: 115,662

[52] U.S. Cl. .................................. 209/111.7, 40/6
[51] Int. Cl. ............................................ B07c 5/342
[58] Field of Search .............................. 250/219 D; 209/111.5, 111.6, 111.7; 40/6; 214/11

[56] References Cited
UNITED STATES PATENTS

| | | | |
|---|---|---|---|
| 3,438,489 | 4/1969 | Cambornac | 209/111.5 |
| 3,511,372 | 5/1970 | Kantarian | 209/111.5 |
| 3,609,306 | 9/1971 | Langley | 250/219 D |

FOREIGN PATENTS OR APPLICATIONS

| | | | |
|---|---|---|---|
| 19,078 | 10/1898 | Great Britain | 40/6 |

Primary Examiner—Richard A. Schacher
Attorney—Louis Altman

[57] ABSTRACT

This is a baggage-handling system in which luggage of any size or shape is wrapped with an encircling belt made of a heat-shrinkable plastic material at a baggage-tagging station designed for this purpose. The baggage is then put on a conveyor which carries it through an oven to shrink the plastic so that the tag is securely attached to the luggage, and the belt lies flat against the surface of the luggage. Destination-identifying indicia printed on the plastic belt are then read by an optical scanner which is positioned alongside the baggage conveyor. Suitable electronic data processing equipment responsive to the optical scanner then controls additional baggage conveying equipment to determine the destination of each individual piece of baggage according to the indicia read from the plastic belt.

34 Claims, 10 Drawing Figures

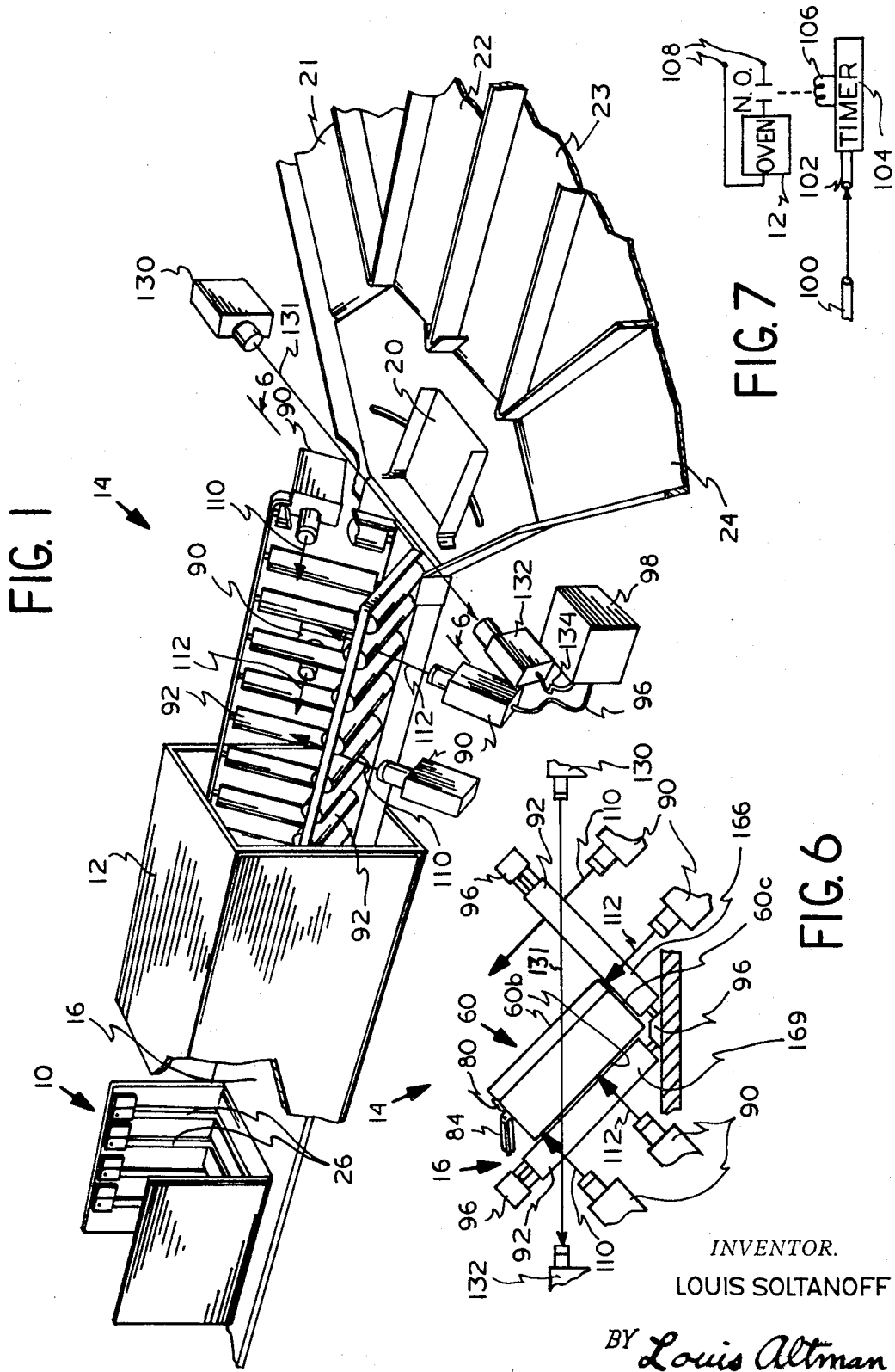

Patented Aug. 14, 1973

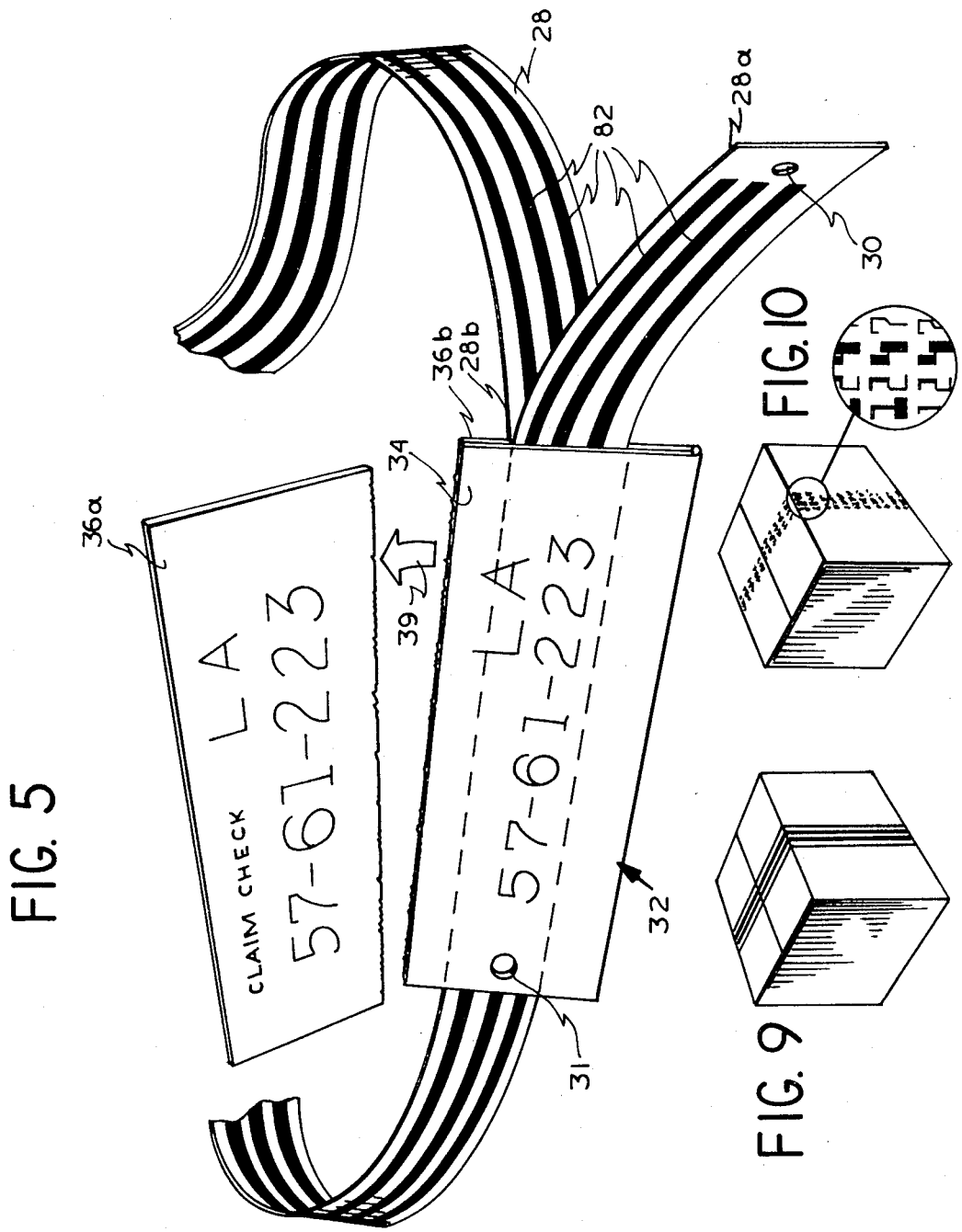

LABEL, METHOD AND SYSTEM FOR BAGGAGE HANDLING

FIELD OF THE INVENTION

This invention relates generally to the field of baggage-handling. It specifically concerns a novel baggage label, and a baggage-handling method and system employing said label.

THE PROBLEM

There is a recognized need for an improved method of handling and identifying the passenger baggage which is carried by airlines. Although this need is not confined to the air travel industry alone, the baggage problem faced by airlines is a particularly difficult one. The passenger is necessarily separated from his heavy luggage, because there is no room for it in the passenger cabin. Instead, heavy items must be stored below the passenger compartment, i.e. in the baggage hold of the aircraft. Then any mistake which the airline may make after taking custody of the passenger's baggage is indeed a serious one, because of the great distances routinely covered by airplanes. These reflections are clearly born out by recent items in the press, concerning surveys which have shown lost luggage to be the principal service complaint of airline passengers. Thus a better method is needed for labeling airline baggage, for guaranteeing that it is loaded aboard the proper airline and reaches its intended city destination at the intended time, and also for unloading the baggage and returning it to the passenger more promptly than has been accomplished in the past.

In addition to better customer relations, there are great advantages which the airlines themselves can gain from improved baggage-handling procedures. Successful automation of these procedures holds out the promise of a reduction in the baggage-handling labor force, and an improvement in the use efficiency of existing baggage facilities, all at a time when the advent of jumbo jet airplanes and consequent peak passenger loads makes these objectives even more important.

The best approach to these problems seems to be the automation of baggage-handling procedures through the use of automatic reading techniques to eliminate human errors, and the automatic control of baggage-handling equipment by such reading devices. One of the problems in designing such automatic systems has been the difficulty of providing a baggage label which can be read reliably by automatic equipment, despite the variability of baggage orientation. Another factor is cost; baggage tags for airline use must be produced at very low unit cost, yet function effectively as electronic data processing input documents. Additional problems arise as a result of the infinite range of sizes and configurations in which passenger luggage appears. Soft-sided luggage, in particular, can change its external shape according to the nature and distribution of its contents at any moment.

THE INVENTION

In the past, most luggage labels have either been wrapped around the handle of the luggage (see Gwinn U.S. Pat. No. 3,077,684, for example) or attached to the handle by a string tie.

According to the present invention, however, a label includes a belt which is wrapped about the body of the luggage and fastened in place by any suitable means which allows the circumference of the belt to be adjusted to that of the bag. The additional security contributed by the baggage-encirclement feature alone makes such a label a better baggage-identification or destination-identification device than those tags known previously.

As an additional feature of the invention, however, destination-identifying indicia are printed on the baggage-encircling belt itself, in a form which is readable by automatic machinery. Then the baggage is carried by a conveyor past a suitable reading device, which scans the belt, determines the identity or destination of the baggage, and controls automatic conveying equipment downstream to send the baggage to its appropriate destination, e.g. a particular aircraft loading station or passenger pick-up station. The fact that the baggage-identifying surface encircles the entire bag makes it much easier to design automatic reading and cooperating baggage-conveying equipment such that the identifying indicia will reliably pass through the field of view and focal plane of the reading device.

In the preferred form of the invention, the baggage encircling band is formed of a shrinkable material, for example one of the heat-shrinkable plastic films which are on the market at the present time, and the bag with its encircling belt are passed through an oven designed to shrink the belt into more tightly encircling relationship with the bag. This further increases the security of attachment of the identifying label to the luggage, and also insures that the belt containing the identifying indicia will be more tightly controlled as to focal plane, position, and attitude for the benefit of automatic reading equipment.

The invention also has additional aspects which relate to specific structure of the means for fastening the belt in baggage-encircling relationship, and to the conveying equipment which maintains the baggage in the right attitude so that the indicia-bearing belt is properly presented to the automatic reading equipment.

BRIEF DESCRIPTION OF THE DRAWINGS

FIG. 1 is a partially schematic perspective view of a baggage-handling system in accordance with this invention.

FIG. 5 is a perspective view similar to FIG. 2, illustrating the condition of the baggage label after attachment to a piece of baggage and detachment of a claim check stub therefrom.

FIG. 6 is an elevational view of the portion of the baggage conveyor of FIG. 1 which carries the baggage past a label-reading station.

FIG. 7 is a schematic electrical circuit diagram of a safety circuit for use with the system of FIG. 1.

FIGS. 9 and 10 are perspective views of cardboard cartons provided with encircling labels in accordance with this invention.

DETAILED DESCRIPTION OF THE PREFERRED EMBODIMENTS

Baggage Labeling

Figure 8:
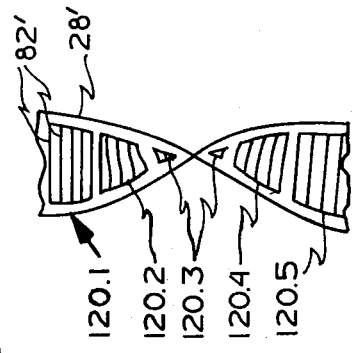
FIG. 8 is a fragmentary elevational view of an alternative type of baggage-encircling belt for use with the label of this invention.

In general terms, the baggage-handling system of FIG. 1 includes a baggage-labeling station 10, an oven 12, a label reading station 14, a baggage conveyor 16 which carries the baggage through the oven 12 and past the reading station 14, and a switching device 20 which diverts the baggage to any one of several conveyors 21 through 24 leading to alternative baggage destinations. These "destinations" could be different aircraft baggage loading stations, so that the choice of exit conveyor 21–24 determines which aircraft the baggage is loaded onto, and which city it is ultimately flown to; or they could be different passenger baggage pick-up stations at the arrival end of the trip; or any other suitable set of alternative baggage destinations.

Figure 2:
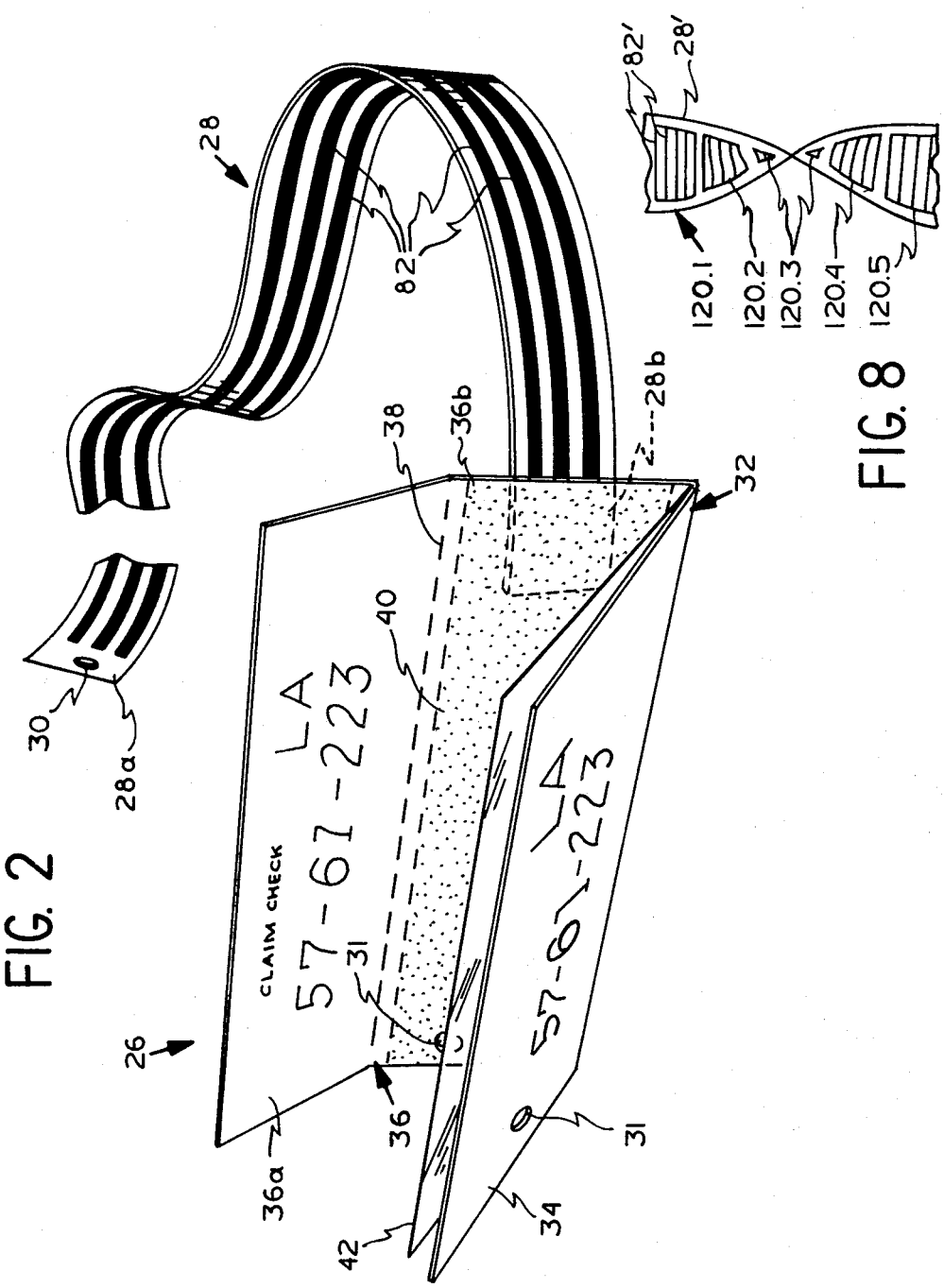
FIG. 2 is a perspective view of a baggage label for use with the system of FIG. 1.

At the baggage-labeling station 10 are individual baggage labels 26, one of which is more clearly illustrated in FIG. 2. Each such label includes an elongated belt 28, preferably made of tough plastic sheet material, one end 28a of which has a hanger hole 30 punched in it, and the other end 28b of which is secured by any suitable means to a combination fastening device and baggage tag 32. Typically the belt end 28b would be glued to an outer surface of tag 32. This tag is also fabricated of sheet material, preferably cardboard or heavy paper, and is folded to form two confronting panels 34 and 36. One of the panels 36 is divided into two portions 36a and 36b along a score or perforation line 38, permitting portion 36a to be easily separated from portion 36b by hand.

The tag 32 serves several purposes. First, it serves as a baggage-identification tag permitting the airline passenger to be re-united with the proper bag upon arrival at his destination, and preventing theft by an unauthorized person posing as the true owner. For this purpose, the external surface of one of the panels, e.g. panel 34, contains, for example, the designation L.A. (for Los Angeles) and the baggage claim number 57–61–223. The claim check stub 36a is similarly marked with the same city and baggage designations, so that the passenger arriving at Los Angeles can readily identify baggage number 57–61–223 and prove his claim by matching the stub 36a.

In addition, the tag 32 serves as a fastening device for securing the two ends 28a and 28b of the belt together so that it can be installed in encircling relationship about a piece of baggage, as a means of attaching the entire label 26 securely thereto. In order to accomplish this, one or both of the confronting surfaces of the panels 34 and 36b are coated with a conventional pressure-sensitive adhesive material 40. In order to prevent this adhesive from gluing the two panels 34 and 36b together prematurely, a sheet of conventional glossy-surfaced release paper 42 is inserted between them. At the appropriate time, the release paper is removed, the tail end 28a of the plastic belt is inserted between the confronting surfaces of panels 34 and 36b, and the panels are pressed together to fasten the tail end 28a of the belt 28 to the tag 32. The result is seen in FIG. 5, which illustrates the topological loop configuration of the belt 28 once its tail end 28a has been secured to the tag end 28b by means of the fastening device or tag 32. FIG. 5 also illustrates the separation of claim check stub 36a from the remainder of the tag 32, along score line 38 (see arrow 39).

Hanger holes 31 are punched in the confronting panels 34 and 36b of the cardboard tag 32, similar to the hanger hole 30 in the belt end 28a. This facilitates the suspension of both ends of each label 26 at the baggage labeling station 10, illustrated in greater detail in FIG. 3. At the labeling station there is provided a pair of upstanding label supporting plates 50 and 52 located on opposite sides of a baggage-labeling floor area 54. A pair of suspension hooks 56 and 58 is mounted on the supports 50 and 52 respectively to support opposite ends of a particular stack of baggage labels 26.1 intended to label baggage headed for Los Angeles. Similar pairs of hooks 62 and 64, 66 and 68, 70 and 72 support stacks of baggage labels 26.2 through 26.4 intended for Chicago, New York, and Boston respectively. Any number of cities can be accommodated in this fashion by simply elongating the baggage-labeling station 10.

Figure 3:
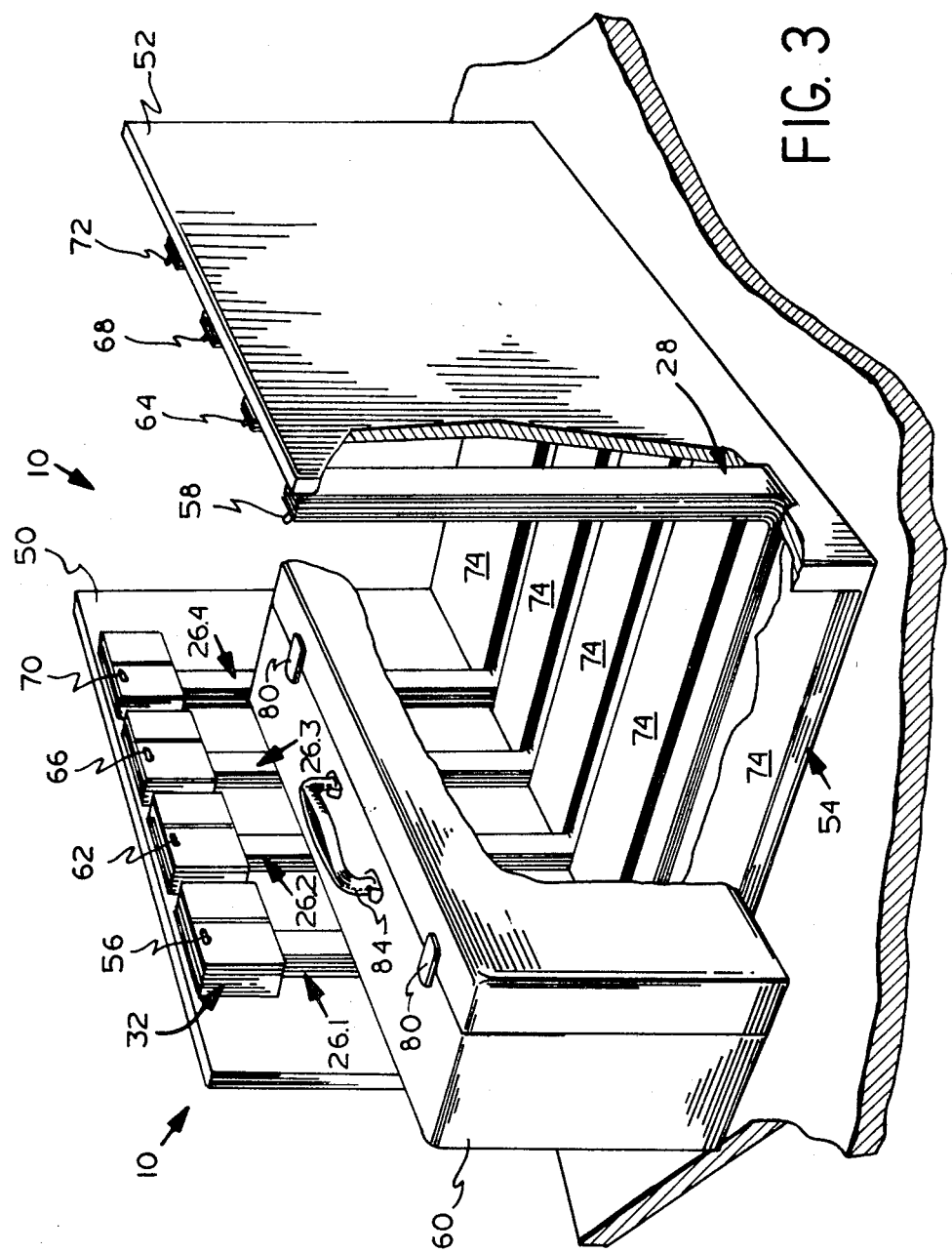
FIG. 3 is a perspective view of a baggage-labeling station in the system of FIG. 1.

Hooks 56, 62, 66 and 70 pass through hanger openings 31 to support the cardboard tags 32, while the opposite hooks 58, 64, 68 and 72 pass through hanger openings 30 in the tail ends 28a of plastic belts 28. As a result, the central portions of belts 28 hang down to the level of the baggage-labeling floor area 54. Between the stacked belts 28 of labels 26.1 through 26.4 marked for different cities, are baggage supporting ribs 74 which serve to hold any piece of baggage 60 above the stacked belts 28. As a result, the baggage 60, when inserted into the baggage labeling station 10 and placed upon the baggage supports 74 as illustrated in FIG. 3, is already encircled on three sides by the belts 28.

The next step is for the baggage attendant to remove the free end 28a of the uppermost belt 28 of the selected city stack (Los Angeles in the example illustrated by FIG. 4) from its hook 58, remove the associated cardboard tag 32 from the opposite hook 56, manually adjust the belt 28 to the circumference of the particular piece of luggage 60, and attach the belt end 28a to the luggage tag 32 by gluing it between the confronting panels as previously described. The attendant also removes the claim check stub 36a, and gives it to the passenger for use in reclaiming his luggage at the arrival end of the trip.

This label is completely flexible in adapting itself to the wide range of luggage configurations and sizes normally encountered in airline operation. The baggage-encircling belt 28 is made long enough to encompass the girth of the largest bag that may be encountered, and the baggage attendant then compensates for smaller luggage circumferences by simply pulling the belt end 28a as tightly as necessary to accommodate any given piece of luggage 60, leaving as great a length as necessary of the tail end 28a hanging loosely from the tag 32.

Even if the invention went no further, the luggage label 26 as so far described would be a significant improvement over those presently used by airlines. One of these is a cardboard tag with human-readable destination-identifying and luggage-claiming indicia thereon, which hangs loosely on the bag and is secured to the handle thereof by means of a tie string. The string is subject to tearing, resulting in loss of the luggage tag. When this happens the luggage often does not reach the intended aircraft and therefore does not arrive at the intended city, or it is not returned promptly to its owner if it does reach the intended city.

Another type of luggage tag in common use consists of a tearable paper or cardboard strip which wraps about the luggage handle and is glued into a closed loop thereabout. Such tags are also insecure because the glued ends project away from the body or handle of the luggage and are therefore exposed to the possibility of tearing. See the Gwinn patent cited above.

In contrast, the tough plastic band 28 of the present baggage label encircles the main body of the baggage; not just the handle 84. In addition, the belt lies close to the body of the luggage, making it more resistant to severing and detachment from the luggage. Note also in FIG. 4 that the belt 28 causes the cardboard tag 32 to lie relatively flat against the surface of the luggage 60. This predictable orientation of the tag 32 makes it less vulnerable, and also facilitates reading of the luggage tag 32 by the human eye. This is an advantage in a non-automated system in which a human attendant has the responsibility of directing the luggage to the proper aircraft loading station, and is also convenient for the passenger when he reclaims his luggage at the destination.

Heat Shrinking

The advantages of the present invention, however, go considerably farther than this. In a preferred embodiment, the plastic material of the baggage-encircling belts 28 is heat-shrinkable. Such materials, which are commerically available from a number of plastics manufacturers, are usually either cross-linked or strain-oriented pre-stretched thermoplastic polymeric or elastomeric films. The materials which can be used for this purpose include polyvinylidine flouride, polyethylene terephthalate, polyvinyl chloride, polyethylene, polyolefin, polystyrene, Neoprene, silicone and butyl elastomers, polyester, polypropylene, polyvinylidine chloride copolymer, and rubber hydrochloride. For a discussion of some of the methods used in manufacturing materials of this kind, see the articles by Brenner in "Modern Plastics", April 1968, pages 118-19, and Lowry in "Modern Packaging Encyclopedia, 1971" 196-202. Briefly, these materials are prepared in sheet or strip form and then are cross-linked by exposure to radiation and/or stretched to induce strains into (i.e. orient) the material. Subsequently, upon the application of heat these materials shrink back to the original dimensions which they had prior to stretching. In the process of shrinking, they assume the contours of any object about which they may be wrapped, and they undergo certain changes in properties including increases in stiffness, tear resistance and abrasion resistance. A heat-shrinkable plastic film material which has been wrapped relatively loosely about an object by hand will pull itself very tightly thereabout when subsequently shrunk.

In the context of the present invention, after wrapping the heat-shrinkable plastic belt 28 hand-tight about the luggage 60 and securing it in place with the adhesive cardboard tag 32, the baggage attendant places the bag on the conveyor 16. The conveyor then carries it through an oven 12 which is open front and rear to form an entrance and exit for the baggage. Such an oven is known as a heat tunnel or shrink tunnel in the plastics packaging industry, where they are commonly used for contour-fitting plastic packaging of a variety of products.

For use in the baggage-handling system of this invention, the air temperature inside the shrink tunnel 12 and the linear speed of the baggage conveyor 16 must be chosen so that the temperature and the exposure time cooperate to achieve significant shrinking of the plastic belt 28 without significant heat transfer to the luggage 60 or its contents, thus avoiding any possibility of damage. On page 196 of the Modern Packaging Encyclopedia (cited above), some representative plots of shrink percentage as a function of temperature are shown for a broad group of heat-shrinkable materials. These curves show that for properly chosen materials, temperatures in the range from 170°-210° F. can achieve shrinkages from about 10 percent to about 60 percent; easily enough to tighten the encircling belt 28 closely against the luggage 60 in the baggage-handling system of this invention. The temperatures just referred to are those to which the plastic films themselves must be heated; as shown by the chart on page 198 of the Modern Packaging Encyclopedia, the air temperature inside the shrink tunnel 12 must be somewhat higher than the target film temperature, even for film thicknesses in the range from 0.4 to 2.0 mils. The preferred thickness for the present application is 3-6 mils, but even with these heavier film gauges, the exposure time inside the tunnel 12 would be of the order of a few seconds, and thus would not result in significant heat transfer to the luggage 60 or its contents. Even sensitive instruments or heat-responsive contents such as aerosol cans inside the luggage 60 will not be damaged by such brief exposures.

Figure 4:
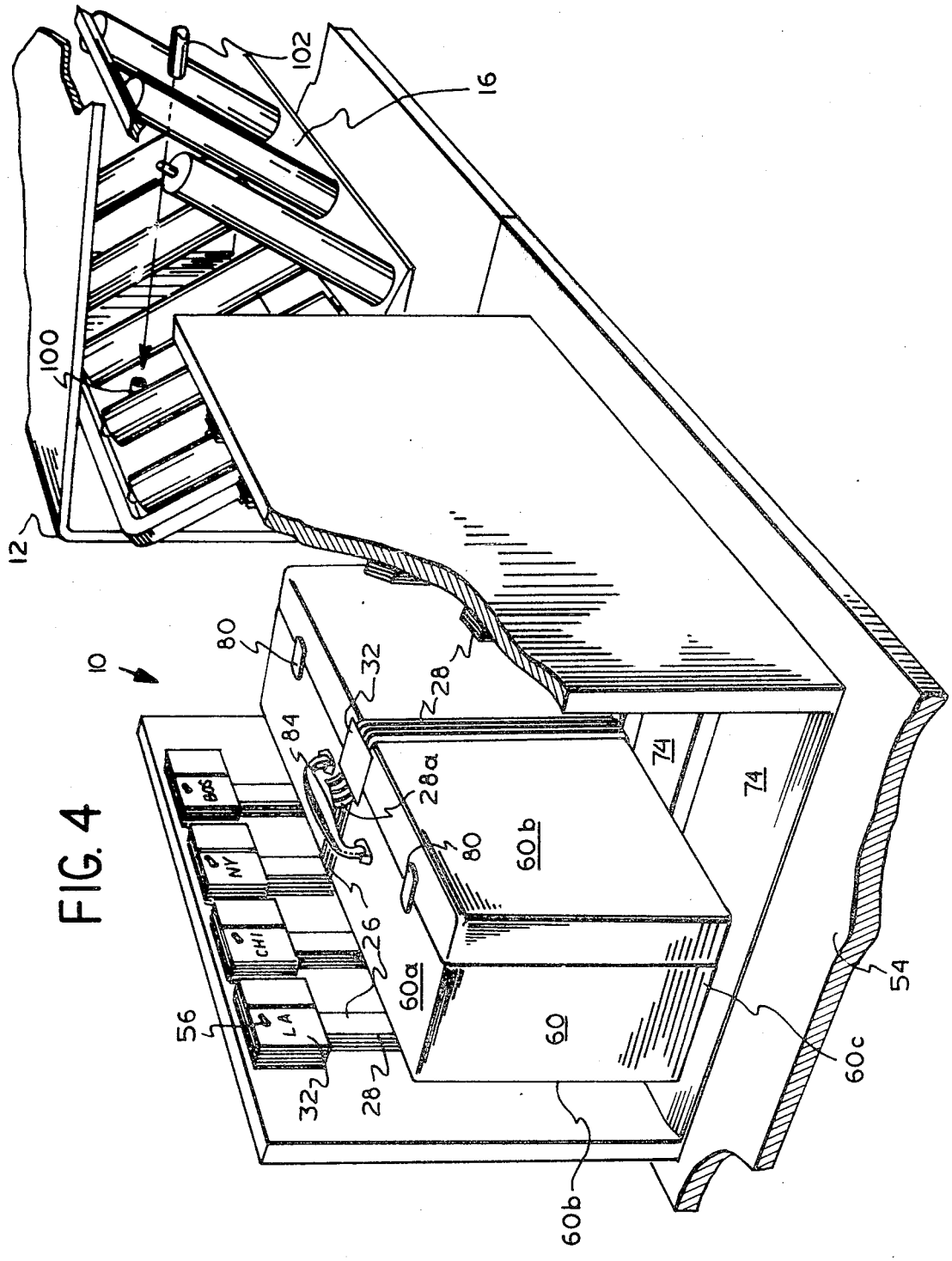
FIG. 4 is a similar perspective view illustrating attachment of the baggage label of FIG. 2 to a piece of baggage at the labeling station of FIG. 3.

A safety mechanism is provided to prevent any piece of luggage 60 from bring subjected to prolonged exposure in the heat tunnel 12 in the event of a conveyor breakdown or other mishap. Accordingly, as seen in FIG. 4, the interior of the tunnel 12 is provided with a light source 100 on one side which is aimed through the interstices of the conveyor 16 and trained upon a photo-detector 102 on the opposite side of the tunnel. As seen in FIG. 7, the photo-detector 102 turns on a conventional timer circuit 104 each time a piece of luggage 60 passing through tunnel 12 interrupts the light beam from the source 100. If the piece of luggage is cleared out of the oven 12 within the timer period, then the continuity of the light beam from source 100 is restored, and the timer is reset before it can affect a normally energized relay 106. But if the luggage remains for the duration of the timer period, then the timer de-energizes relay 106, allowing its normally open relay contacts to disconnect the heating element of the oven 12 from their power terminals 108. Since the contacts of relay 106 are normally open, any malfunction of the components 100, 102, circuit 104 or relay 106 will fail safe, preventing catastrophic heating of the baggage 60 within the oven 12.

It is within the contemplation of this invention that other approaches may be used for shrinking the plastic material of the baggage-encircling belt 28. For example, in the electrical industry plastic materials used to insulate wires and soldered terminals are frequently shrunk with the use of small, hand-held hot air blowers which apply a localized blast of hot air to a selected target area. It is conceivable that the baggage-handling system of this invention may employ such hand-held devices, or that a ring-shaped hot air nozzle encircling the baggage 60 may be employed for directing a stream of hot air selectively to the plastic belt 28.

It is also contemplated that means other than the pressure-sensitive-adhesive-coated cardboard tag 32 may be employed to attach the two ends of the plastic belt 28 together. For example, the plastic material of the belt may be heat-sealed directly to itself by means of an appropriate hand-held heat-sealing tool. In that event, care must be taken that the temperatures applied during the shrinking step do not exceed the sealing temperature of the particular plastic material employed. In that connection, the chart on page 198 of the Modern Packaging Encyclopedia demonstrates that for most heat-shrinkable plastic materials there is a safe temperature range within which shrinkage takes place, but heat-sealing, or the softening of a heat-sealed bond, does not.

The shrinking of the plastic baggage-encircling belt 28 enhances those advantages of the present baggage label which were referred to previously. First, the heat-shrinking process generally increases the resistance of the belt 28 to various types of destructive forces to which they may be subjected during handling and in flight, and which have been a major cause of baggage tag losses and consequent misdirecting of baggage in the past. Secondly, the shrinking of the belt material causes the label 26 to adhere even more tightly to the luggagge 60 than it would if the belt were only hand-tight. As a result, the belt clings more closely to every contour of the luggage and is still less susceptible to being caught by passing edges which might tend to cut the label loose. Even if the baggage is of the soft-sided type which largely assumes the shape of its contents, the belt 28 will conform closely to that shape however irregular it may be, resulting in a considerable improvement in baggage-labeling security. Thirdly, the tension developed in the belt 28 by heat-shrinking makes it in effect a baggage strap, which, when wrapped about the luggage 60 in the direction illustrated in FIG. 4, helps to prevent the luggage from opening in the event that any mishap should affect the luggage locks 80. As a result, spillage of the contents of the luggage is far less likely. Finally, the advantage spoken of previously, the fact that the orientation of the outer surface of the cardboard tag 32 in relation to the luggage 60 is predictable, is further enhanced by shrink-tightening of the belt 28.

Machine Reading

Still another, and the most important, aspect of this invention, relies on the fact that a belt 28 completely encircling the luggage 60 can be read automatically by conventional optical scanning means without the need for finding one particular location at which the machine-readable information is solely located. A machine-readable data pattern may be printed over nearly the entire length of the baggage-encircling belt 28. The data pattern could be any standard optical character recognition alphanumeric type font, or alternatively it could be a coded pattern such as the parallel bars 82 seen in FIGS. 2 and 5. As a precaution against twisting of the belt 28 or misalignment of the stack of baggage labels 26 at the labeling station 10, this data pattern is preferably printed on both sides of the belt so as to be readable in any case. The data pattern is one which represents or encodes information representing a particular destination, i.e. the loading station for a particular flight, a particular city, or a particular passenger baggage pick-up station.

The bar pattern 82 is encoded in terms of the relative widths of the dark bars 82 or the intervening parallel white stripes. Equipment for the automatic reading of such bar-coded information is known, a representative machine being described in U.S. Pat. No. 3225177 of Stites et. al. Typically such equipment comprises a light source directing a beam of light onto a rotating polygonal mirror drum. The rotation of the mirrored drum serves to scan the light beam across the surface bearing the bar code information in a direction transverse to the longitudinal dimension of the bars. The light beam is reflected back from the data-bearing surface and from the polygonal drum through a fixed-focus optical system which focuses an image of the bar code pattern upon a mask formed with a slit appropriately sized in relation to the width of the code bars or their intervening spaces. The Stites patent cited above discloses a color-coded data scheme, but it is well within the skill of the art to use black bars 82 with intervening white spaces. Either approach is practical for use with this invention.

With this brief description of a Stites optical scanner as background, the reader will appreciate that its important operating constraints are: First, the data-bearing surface must be within the focal plane of the optical system (the term "focal plane" is used herein to include the tolerance permitted by depth of field). Second, the direction of scan must cut transversely across the longitudinal direction of the data code bars 82. Third, the scanner does not have any capability for searching out the data bearing target surface; the code pattern must be brought directly across a fixed field of view in a highly reliable manner.

In this baggage handling system, the problem of focal plane is dealt with, first, by designing the conveyor 16 so that it moves the surface of the baggage 60 though the desired focal plane (the depth of field is about 8 inches). Then the tight conformity of the heat-shrunk baggage-encircling belt 28 can be relied on to keep the data-bearing belt 28 very close to the surface of the luggage 60.

The problem of scanning direction is handled by scanning in a first direction and printing the code bars on the data-bearing belt 28 in a transverse direction so that the scanning direction and the longitudinal axis of the code bars 82 will be nearly perpendicular to each other.

Finally, the problem of bringing the desired data pattern precisely in front of the line of sight of the optical scanner again illustrates the advantages of the present baggage label. Because the belt 28 completely encircles the luggage 60, the data code pattern 82 is likely to be readable at any location about the circumference of the baggage, with the exception of the top surface 60a where a carrying handle 84 and one or more conventional style dangling baggage tags remaining from previous trips may obsure the data pattern. The cardboard tag 32 also obscures part of the data-bearing surface of belt 28, as does the free-hanging length of belt tail 28a. Accordingly, the baggage handler who is responsible for attaching the labels 26 to each piece of luggage 60 is trained to put the tag 32 and the freely hanging belt tail 28a as near as possible to the top surface 60a and the carrying handle 84 of each piece of luggage 60, thus confining all known hazards to the one area which in any event would be least desirable for machine reading. Then, the optical scanner may be aimed at any other convenient location around the remaining circumference of the baggage 60, including the sides 60b and the bottom 60c, and the reading reliability is greatly enhanced.

With reference to FIGS. 1 and 6, the conveyor 16 as it emerges from the shrink tunnel 12 moves the baggage 60 through the reading station 14, at which there are located a plurality of optical scanners 90, for example of the Stites type. The conveyor 16 comprises two separate beds 16a and 16b which are set at an angle of 90° to each other to form a shallow V-shaped configuration (see FIG. 6). The baggage handler who mans the labeling station 10 is trained to set the luggage 60 down upon the two beds of the conveyor 16 in such a way that one side 60b of the luggage rests flat against one of the conveyor beds 16a while the bottom 60c of the luggage rests flat against the other conveyor bed 16b, under the influence of gravity. In this way the conveyor beds 16a and 16b establish fixed focal planes against which the surfaces 60b and 60c of the luggage rest. Then one pair of optical scanners 90 is focused on side surface 60 b, while another pair of scanners is focused on bottom surface 60c.

Each conveyor bed consists of a series of spaced parallel rollers 92, rotatably mounted upon shafts 94 and supported by upper and lower structures 96, at least one of which contains driving machinery so that the rollers 92 of at least one of the two conveyor beds is motor-driven. The scanners 90 are aimed through the spaces between rollers 92, and the spacing between adjacent rollers of each conveyor bed is chosen at least as great as the data-bearing width of the baggage-encircling belt 28, so as to give the optical scanners 90 a clear line of sight to the data-bearing surface.

In order to minimize the effects of an occasional twist or obstruction that may fall in the line of sight, redundancy is provided. Each of the four optical scanners is aimed at a different location about the baggage circumference encircled by the belt 28. It has already been noted that two of the scanners 90 are aimed at the luggage side surface 60b, while the other two are aimed at the bottom surface 60c. The probability that twists or obstructions will affect both surfaces of a single piece of luggage is small. In addition, for greater reliability, the two scanners 90 on a given side are aimed at different levels on the same surface of the luggage 60. Thus, one of the scanners of each pair is aimed at the lower portion of the luggage surface (arrows 112), while the other is aimed somewhat higher on the same surface (arrows 110). This further reduces the chances that problems may cause a complete data blackout.

The Stites optical scanner has a tolerance of about plus or minus 15° of angular mis-orientation of the data bars 82 from the vertical. In order to make maximum usage of this tolerance, one of the scanners 90 on each side of the conveyor belt 16 is skewed at an angle of 10° to 15° to the left, while its companion on the same side of the conveyor is skewed 10° to 15° to the right. As a result, there is a range of from nearly minus 30° to nearly plus 30° off vertical in which at least one of the optical scanners 90 on each side of the conveyor 16 can still get a useable data reading. It is reasonable to expect that the baggage handler will install the baggage-encircling belt 28 on each piece of luggage 60 within a tolerance of plus or minus 30° from the vertical in nearly all instances. Once the band 28 is so installed, the heat-shrinking process will fix the belt 28 so tightly in place upon the baggage 60 that there is little chance of its being angularly displaced thereafter.

If the code bars 82 extend parallel to the longitudinal axis of the belt 28 (as seen in FIGS. 2, 4 and 5), the scanning direction of the Stites optical scanners 90 must be horizontal, and the speed of the conveyor 16 affects the scanning velocity to some extent. This, however, is not a problem, because the conveyor speed is known and constant, and also because it is small in relation to the effective linear scan velocity of the readers (the latter quantity is a function of the angular velocity of the rotating mirror drum multiplied by the length of the reflected light beam). An advantage of this geometry is that the plastic belt 28 (by the use of one-dimensional stretching or orienting techniques known in the plastics industry) can be made heat-shrinkable along its length direction only, thus pulling it tightly about the luggage 60 without affecting the coded widths of the data bars 82. A disadvantage of this approach is that the belt 28 must be wide enough to accommodate all necessary data across its breadth; or if the data pattern is reduced in size to fit on a narrower belt, some depth of field might have to be sacrificed by the Stites scanner.

Another alternative is to print the code pattern with bars 82' extending across the width of a plastic belt 28' as seen in FIG. 8. If this approach, or an optical character recognition approach, is adopted, complete separate destination identifications must be repeated periodically along the length of the belt 28' (as at locations 120.1 through 120.5) in order to carry out the concept of data readability about the circumference of the bag 60. In addition, since it can not be guaranteed that a scan will begin precisely at the start of any one of the data patterns 120.1 – 120.5, the length of belt 28' covered by each reader scan must be at least twice the period of repetition of the data patterns 120.1 – 120.5 to insure that at least one complete data pattern will be covered from end to end during each scan. Furthermore, the scan speed must be high enough, in relation to the linear speed of the conveyor 16 and the width of the sight gaps between conveyor rollers 92, so that a scan of the required length can be completed within the time that the data-bearing width of belt 28' remains "windowed" between the roller gaps. Note also that here the heat-shrinking process must affect the coded widths of the data bars 82'. Consequently the extent of shrinking must be more carefully controlled, and the Stites scanners must be adjusted to read the data patterns 120 in a pre-determined shrunken condition. Here again, the belt 28' is printed on both sides as seen in FIG. 7 to defeat twisting or reversal of the belt.

The destination data read by the optical scanners 90 is fed over cables 96 to a conventional small-scall, general purpose programmable electronic computer 98, which is programmed to operate the baggage diverting switch 20 in accordance with the machine-read destination information, thus making the proper choice among the alternative exit conveyors 21 – 24.

In speaking of a "destination identification" encoded on the belt 28 or 28', it is intended to encompass also the situation in which the belt is imprinted only with a serial number or other baggage identification, but the computer 98 is independently provided with information as to the destination (or intermediate and final destinations) of the baggage so numbered or identified. To that computer, the serial number or baggage identification is equivalent to a destination identification. Such a system is especially adapted to handle the problem of luggage transfer between flights or between airlines at intermediate destination.

One of the exit conveyors is preferably an "error" exit which puts a bag aside for human attention when for any reason the scanners 90 cannot get a reading. Each time a bag 60 goes through the reading station 14 it breaks a light beam 131 sent by a lamp 130 to a photo-detector 132. The latter is connected to computer 98 by a cable 134, and the computer is programmed to select the error exit whenever the light beam 131 is broken by the passage of a bag 60 and the scanners 90 fail to obtain a meaningful reading from the belt 28 or 28'. At that time, the computer also sounds an alarm to alert an attendant.

In the great majority of instances, however, the labeled luggage 60 will be sent to the appropriate aircraft loading location, and will thus be delivered to the appropriate city. Subsequently, similar equipment in accordance with this invention can be used at the aircraft unloading ramp to see that the baggage finds its way to the proper one of several passenger baggage pick-up locations.

The invention is also applicable to other types of baggage, such as the cardboard cartons seen in FIGS. 9 and 10. The first has a width-coded bar format similar to that of FIGS. 2, 4 and 5 printed directly on the carton. The other has a repetitive data pattern similar to that of FIG. 8 printed directly thereon, the data being in an optical character recognition format. The data pattern of FIG. 8 could be printed directly on the carton of FIG. 10, and conversely.

Conclusion

In summary, this invention provides a baggage label which is an improvement over previous labels in that it completely encircles the luggage and is thus more reliably attached thereto and more predictably oriented for both human-reading and machine-reading purposes. Secondly, the heat-shrinking aspect of the invention makes the baggage label still more secure, further enhances the predictability of its orientation for reading purposes, and has incidental benefits such as luggage-strapping. Finally, this baggage label, by virtue of such positional predictability, security of attachment to the luggage, and the fact that it is readable at almost any position around the circumference of the luggage, lends itself to a machine reading system which removes the human error and labor cost and provides a high-speed reliable system of automatic baggage handling.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. A method of baggage identification comprising the steps of:
   forming a baggage-encircling belt;
   providing fastening means for securing a first portion of said belt to an adjustably selectable second portion thereof so that said belt and said fastening means jointly form a closed baggage-encircling label of a circumference selected in relation to the circumference of a piece of baggage;
   putting a destination identification on at least one portion of said label;
   encircling the main body of said baggage with said belt;
   adjusting said belt to said selected circumference;
   subsequently securing said belt at said selected circumference with said fastening means;
   subsequently reading said destination identification on said label to determine the intended destination of said baggage;
   and subsequently moving said baggage to the destination so indicated.

2. The method of claim 1 wherein said destination identification includes printed machine-readable indicia on said baggage-encircling belt, and a machine capable of reading said indicia is employed to determine automatically which destination is identified thereby.

3. The method of claim 2 wherein automatic means are operative for diverting said baggage to the indicated one of a plurality of alternative destinations in response to the reading of said destination identification by said reading machine.

4. The method of claim 1 wherein said belt is formed of a shrinkable material, and after said belt is encircled about said baggage and secured by said fastening means to form said closed baggage-encircling label, said belt is treated in a manner to shrink it to a tighter fit about said baggage whereby to attach said label more securely thereto.

5. The method of claim 4 wherein said belt material is a heat-shrinkable plastic film, and said shrinking treatment comprises heating said film.

6. The method of claim 1 wherein a claim check is separably secured to said label, and further comprising the steps of putting duplicate human-readable baggage identifications on said label and said claim check respectively, separating said claim check from said label, and delivering said claim check to the owner of said baggage at the time the owner delivers said baggage to a carrier, to facilitate subsequent reclaiming of said baggage by the owner.

7. A baggage label comprising:
   a belt for encircling the main body of a piece of baggage;
   means for fastening a first portion of said belt to an adjustably selectable second portion thereof so that said belt and said fastening means may jointly form a closed baggage-encircling label of a circumference selected in relation to the circumference of said main body of said baggage;
   and printed identifying markings secured on at least one outwardly-facing surface of said baggage-encircling belt portion of said label.

8. A label as in claim 7 wherein said fastening means comprises a sheet secured to said first portion of said belt, at least one surface of said sheet being coated with an adhesive material for bonding said sheet to said adjustably selectable second portion of said belt.

9. A label as in claim 8 wherein said sheet of material is a tag at least one surface of which is ink-receptive and not coated with adhesive, and has at least some of said identifying markings thereon.

10. A label as in claim 9 wherein said printed markings are in human-readable form.

11. A label as in claim 10 wherein said tag has a claim check stub attached thereto along a score line for easy separation, and said ink markings comprise duplicate human-readable baggage-identification indicia printed on said tag and on said claim check stub respectively.

12. A label as in claim 8 wherein said sheet is folded to form confronting panels, said first portion of said baggage-encircling belt is attached to one of said panels, said adhesive material is pressure-sensitive and coated on at least one of the confronting surfaces of said panels, and a sheet of release material is removably located in confronting protective relationship between said confronting surfaces so that said release material may be removed and said baggage-encircling belt may be wrapped about said baggage and said selected second portion thereof interposed between said confronting surfaces and said panels pressed together to secure said sheet to said belt at said second portion thereof for forming said closed baggage-encircling label.

13. A label as in claim 7 wherein said markings identify a destination and are in machine-readable form.

14. A label as in claim 7 wherein said baggage-encircling belt is formed of a material shrinkable to a tighter fit about said baggage whereby to attach said label more securely thereto.

15. A label as in claim 14 wherein said material is a heat-shrinkable plastic film.

16. A baggage-handling system comprising:
baggage labels each having at least one surface which bears printed machine-readable identifying indicia including areas of differential optical character,
means for securing said labels to respective pieces of baggage which are initially separate from said labels, in a manner such that said indicia-bearing member thereof contiguously overlies the outer surface thereof facing outwardly from said baggage,
optical means capable of automatically reading said indicia and focused on a selected target location in a selected focal plane, and
conveying means for moving said baggage past said reading means while retaining said outer baggage surface in effective proximity to said focal plane for automatic reading of said indicia-bearing label surface, said indicia-bearing member comprising a belt, and said label including means for securing said belt to said baggage in closely contiguous encircling relationship to the main body thereof.

17. A baggage-handling system comprising:
baggage-identifying labels each including a belt adapted to encircle the main body of the baggage, and printed machine-readable destination-identifying indicia on said belt;
and a reading station including equipment for reading said indicia automatically.

18. A system as in claim 17 further comprising equipment for automatically conveying successive pieces of labeled baggage to said reading station in a manner to present said belt indicia to said reading equipment for reading thereby, wherein said conveying equipment comprises at least one bed formed with at least one reading gap therein, and arranged so that said bed establishes a focal plane against which one surface of a piece of baggage rests when said baggage is being conveyed thereby;
and said reading equipment comprises optical reading means aimed through said reading gap in said conveyor bed and substantially focussed on said focal plane.

19. A system as in claim 17 further comprising equipment for automatically conveying successive pieces of labeled baggage to said reading station in a manner to present said belt indicia to said reading equipment for reading thereby, wherein said conveying equipment comprises a pair of beds formed with respective reading gaps therein, and arranged so that one of said beds establishes a first focal plane against which a side surface of a piece of baggage rests and the other establishes a second focal plane against which the bottom surface of said baggage rests when said baggage is being conveyed thereby;
and said reading equipment comprises a first optical reading means aimed through a reading gap in said first bed and substantially focussed on said first plane, and a second optical reading means aimed through a reading gap in said second bed and substantially focussed on said second plane.

20. A system as in claim 17 further comprising equipment for automatically conveying successive pieces of labeled baggage to said reading station in a manner to present said belt indicia to said reading equipment for reading thereby, wherein said machine-readable indicia comprise successive parallel code bars of contrasting optical character, the relative widths of which encode said destination identification.

21. A system as in claim 20 wherein at least one of said reading means comprises a plurality of reading devices aimed at different target locations, said target locations being spaced apart from each other in a direction transverse to the direction of conveying equipment motion whereby to read different scanning tracks on said baggage.

22. A system as in claim 21 wherein said code bars extend parallel to the baggage-encircling dimension of said belt so that their relative spacings are readable at a plurality of such spaced target locations about the encircled circumference of said baggage.

23. A system as in claim 22 wherein said reading equipment is designed to scan said label in a direction parallel to the direction of conveying motion for detecting said code bar spacings.

24. A system as in claim 21 wherein said code bars extend transversely to the baggage-encircling dimension of said belt, and complete destination identifications are repeated periodically about said belt in a direction parallel to the baggage-encircling dimension thereof so that said code bar spacings are readable at a plurality of such spaced target locations about the encircled circumference of said baggage.

25. A system as in claim 24 wherein: said reading equipment is designed to scan said label in a direction transverse to the direction of conveying equipment motion for detecting said code bar spacings, and designed so that the length of said baggage-encircling belt covered by each reading scan is at least twice the period of repetition of said code bars at the time of the scan; and said conveying equipment is designed to operate at a linear speed such that the amount of conveying motion achieved thereby during the time required for one complete scan by said reading equipment is no greater than the dimension of said code bar indicia in the direction of conveying motion.

26. A system as in claim 17 further comprising a baggage-labeling area including a floor, at least one pair of spaced means for supporting baggage above said floor, a pair of up-standing label supports on opposed sides of said labeling area, and respective means on each of said label supports for suspending opposite ends of said baggage-encircling belt above said floor in such manner that intermediate portions of said belt rest between said pair of baggage supports and between said floor and the bottom-most surface of the baggage supported thereon so that said belt partially encircles said baggage as soon as said baggage is placed on said supports.

27. A system as in claim 17 wherein said baggage-encircling belt is formed of a shrinkable material, and further comprising means for shrinking said belt to a tighter fit about said baggage whereby to attach said label more securely thereto.

28. A system as in claim 27 wherein said band material is a heat-shrinkable plastic film, and said shrinking means comprises a heat source.

29. A system as in claim 28 wherein said heat source is tunnel-shaped, and further comprising means for automatically moving labeled baggage through said tunnel at a predetermined speed so as to subject said baggage-encircling belt thereon to elevated temperature for a predetermined time.

30. A baggage attachment comprising a belt of heat-shrinkable plastic film for encircling the main body of said baggage, and fastening means for securing said belt in contiguous, closed encircling relationship to said baggage, said fastening means being adjustable, at least prior to fastening, so as to match the circumference of said belt to that of said baggage.

31. A baggage attachment as in claim 30 wherein said fastening means comprises confronting panels secured together along one edge, a first portion of said belt is attached to one of said panels, pressure-sensitive adhesive material is coated on at least one of the confronting surfaces of said panels, and a sheet of release material is removably located in confronting protective relationship with said confronting surfaces so that said release material may be removed and said belt may be wrapped about said baggage and a selected second portion thereof interposed between said confronting panel surfaces and said panels pressed together to secure said first and second belt portions together and thereby retain said belt in encircling position relative to said baggage.

32. A system comprising a package with machine-readable markings extending about at least a major portion of a selected circumference thereof, and optical data reading equipment designed to scan an area of said package which intersects with said machine-readable markings only over a minor portion of said selected package circumference, said markings comprising at least one data pattern arranged to be readable by said equipment at any such intersection occurring at any randomly selected location about at least a major portion of said selected package circumference.

33. A system as in claim 32 wherein said machine-readable markings comprise a single data pattern formed of width-coded bars the lengths of which extend about at least a major portion of said selected package circumference.

34. A system as in claim 32 wherein said machine-readable markings comprise a plurality of repetitive machine-readable data patterns occurring periodically at locations spaced from each other in the direction of said selected package circumference and together extending about at least a major portion of said circumference.

* * * * *